Figure 1:
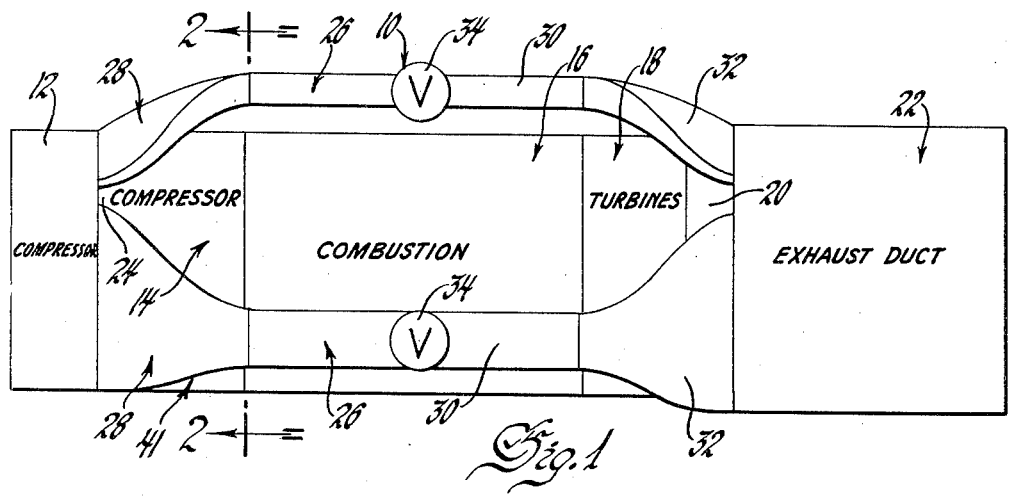

Dec. 25, 1962  J. B. WHEATLEY  3,070,131
BY-PASS DUCT FOR GAS TURBINE ENGINE
Filed Dec. 6, 1957  5 Sheets-Sheet 1

INVENTOR.
John B. Wheatley
BY
Paul Fitzpatrick
ATTORNEY

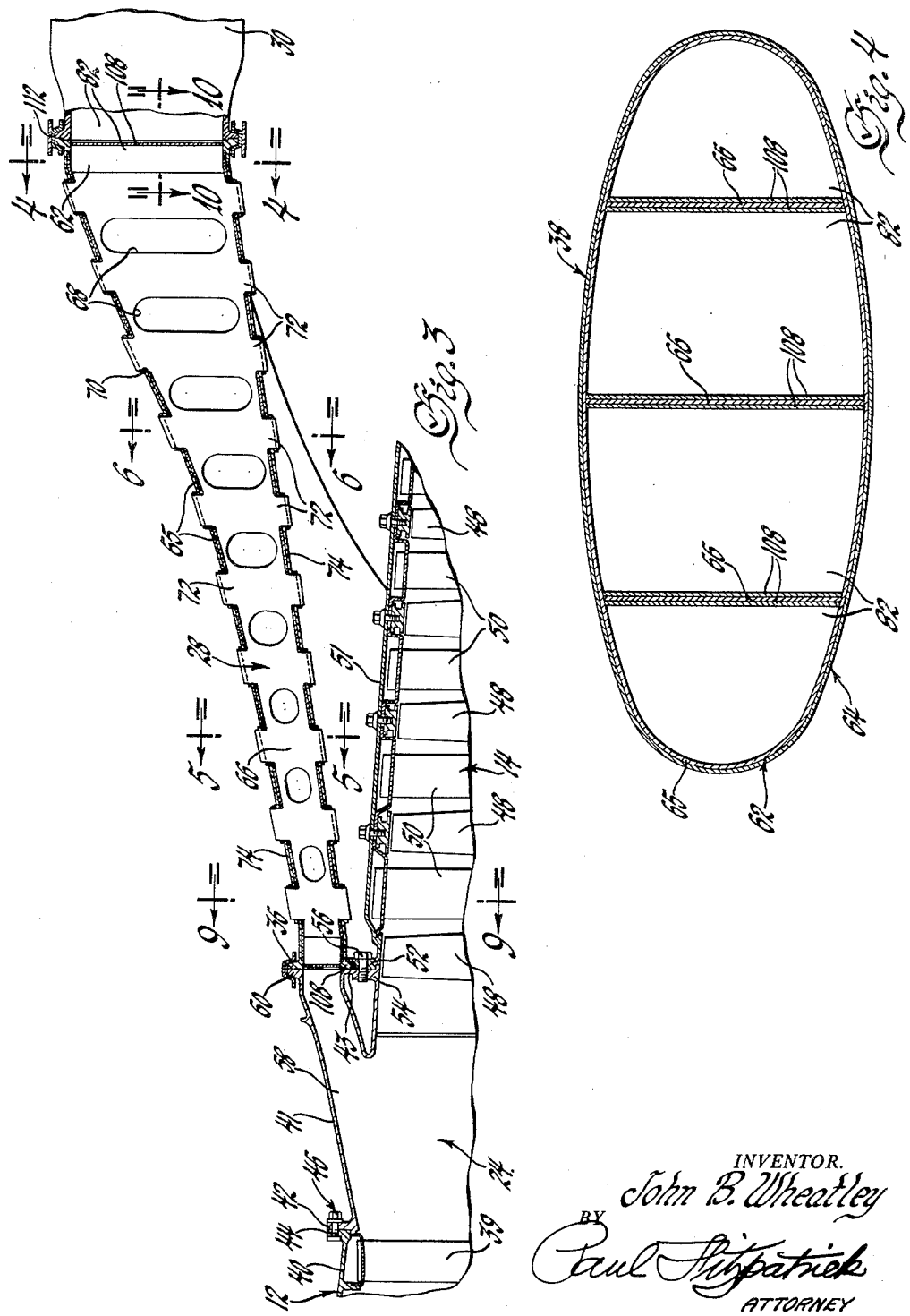

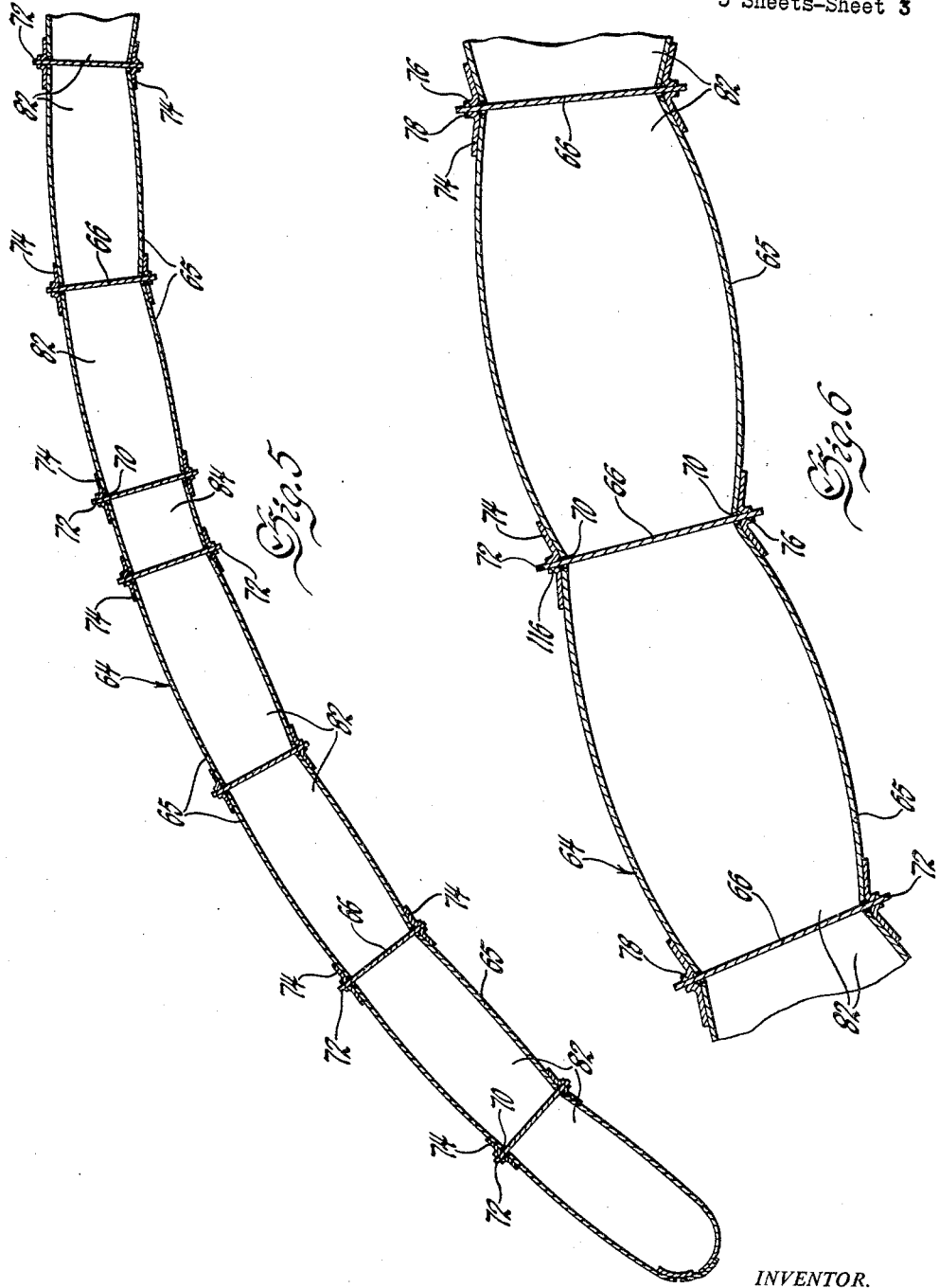

Dec. 25, 1962 J. B. WHEATLEY 3,070,131
BY-PASS DUCT FOR GAS TURBINE ENGINE
Filed Dec. 6, 1957 5 Sheets-Sheet 5

INVENTOR.
John B. Wheatley
BY
ATTORNEY

United States Patent Office 3,070,131
Patented Dec. 25, 1962

3,070,131
BY-PASS DUCT FOR GAS TURBINE ENGINE
John B. Wheatley, Indianapolis, Ind., assignor to General Motors Corporation, Detroit, Mich., a corporation of Delaware
Filed Dec. 6, 1957, Ser. No. 701,268
7 Claims. (Cl. 138—115)

This invention relates to a dual-spool gas turbine engine.

In dual-spool gas turbine engines having low and high pressure compressors, "design-point" operation is generally the exception rather than the rule since it is extremely difficult to "match" the stages at all speeds such that the compressor speed and the inlet temperature and pressure combine in a manner to correspond precisely to the design condition. A design condition to give satisfactory performance and efficiency throughout a high speed range generally results in poor performance or even stall in the low speed range. This poses a matching problem because of the tendency of the low pressure compressor operating point to move toward surge. However, lowering of the design point by an amount sufficient to provide the necessary surge margin at low speeds will generally result in unacceptable high speed performance. Therefore, some means must be provided for either raising the surge line or depressing the operating line. Such a means would alter the compressor stage matching to provide an engine design having, for example, good subsonic cruise characteristics without encountering surge yet giving satisfactory performance at high Mach number flight speeds.

The means for accomplishing this result is the subject of this invention. Since both the high and low pressure compressors are designed to handle the same quantity of flow, relieving the back pressure on the low pressure compressor by ducting a predetermined percentage of the air through a by-pass to the exhaust duct or to the inlet to the afterburner causes the low pressure compressor operating point to move out of surge. This results in a decrease in the angle of attack of the air on the blade rows of the low pressure compressor forward of the by-pass or bleed and an increase in the angle of attack on the blade rows of the high pressure compressor to the rear of the by-pass. The net result is improved stage matching with a concurrent improvement in efficiency.

Therefore, this invention relates to providing a bleed or by-pass for air discharged from a low pressure compressor of a gas turbine engine to prevent surge therein.

More specifically, this invention relates to the particular construction of an air bleed or by-pass between compressors to improve compressor off-design operation.

Since any addition of ducting to a gas turbine engine necessarily will increase the weight and drag and therefore reduce the efficiency, the by-pass must be constructed so as to offer the least increase in frontal area of the engine and must also be as light as possible. The present invention accomplishes both of these purposes by providing a variable by-pass configuration constructed of thin sheet metal reinforced by ribbing. The metal selected is sufficiently thin to permit the metal to balloon out to approximate a natural catenary curve form when air under pressure is introduced into the bleed. The ribbing or struts in tension therefore carry all of the load and a satisfactory lightweight by-pass is provided with substantially no sacrifice of engine performance.

Therefore, it is an object of this invention to provide a compressor air bleed or by-pass of a variable configuration to occupy the least amount of space while maintaining a constant air flow area to relieve back pressure on the compressor.

It is a further object of this invention to provide a variably constructed compressor air bleed having a number of inlet zones together completely encompassing the gas turbine engine and connecting with air discharges by tapered air ducts of thin metal.

It is a still further object of this invention to provide a compressor air bleed comprising a number of tapered ribbed ducts with the skin between ribs assuming an approximate catenary curve form.

It is also an object of this invention to provide a compressor air bleed of the proper shape and construction to prevent surge in the low pressure compressor of a dual-spool gas turbine engine, while providing the lightest and least complex arrangement at substantially no sacrifice of engine performance.

Figure 2:
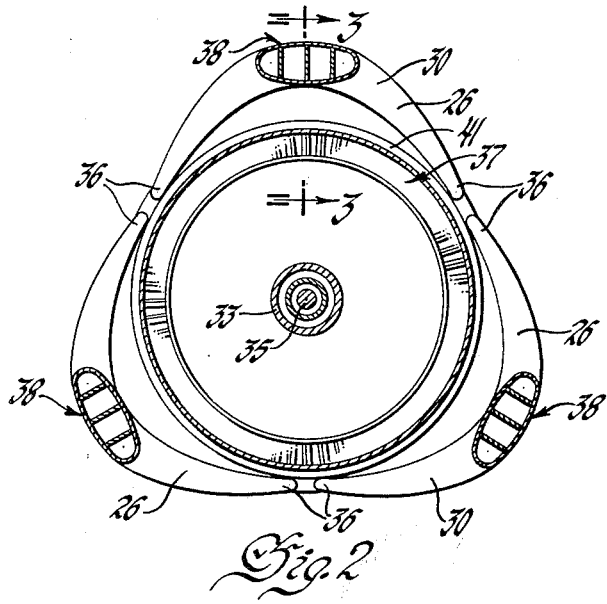
Figure 7:
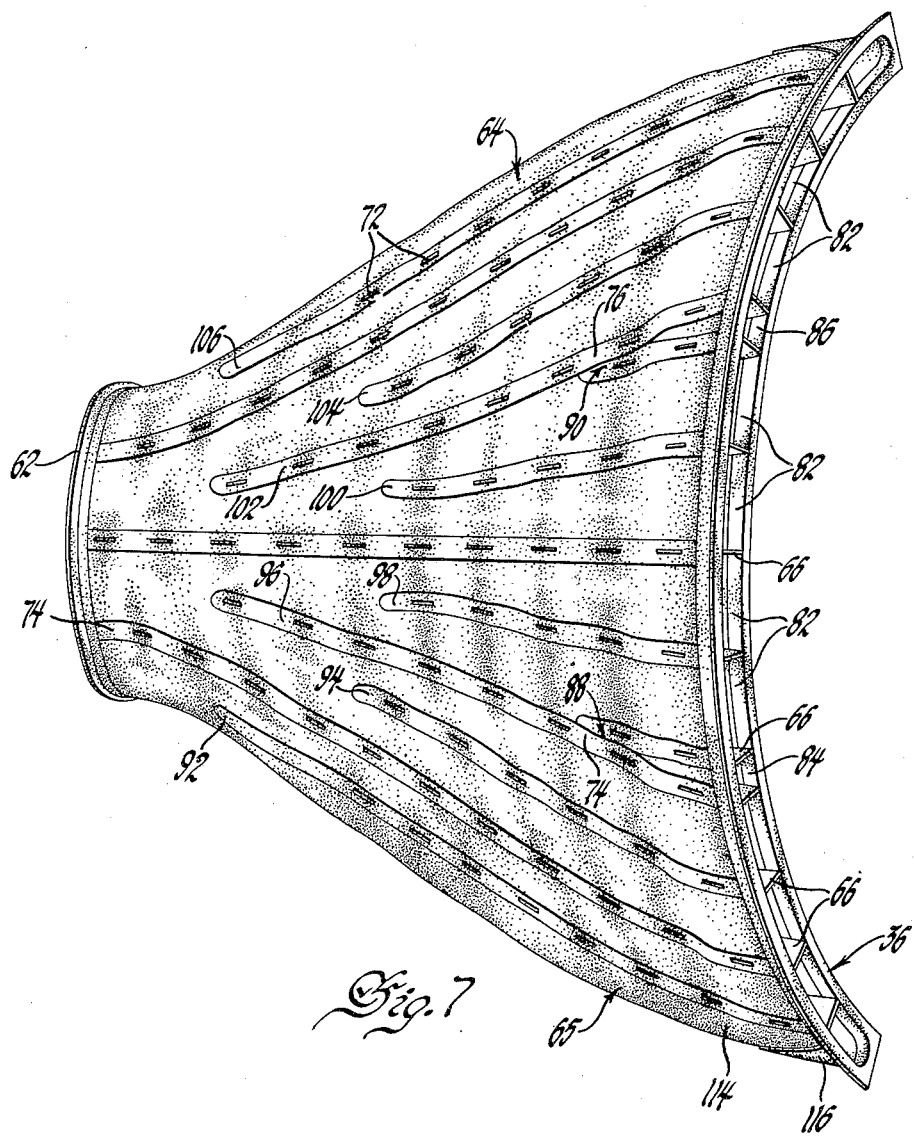
Figure 8:
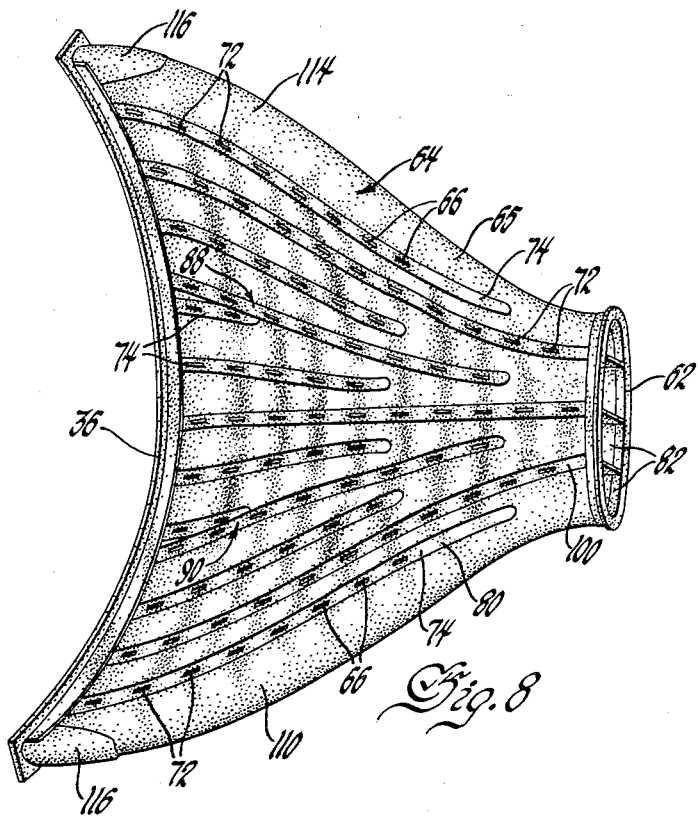
Figure 9A:
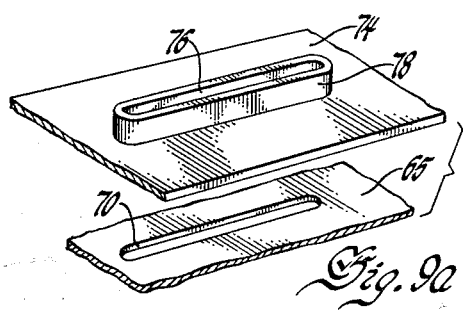
Figure 9:
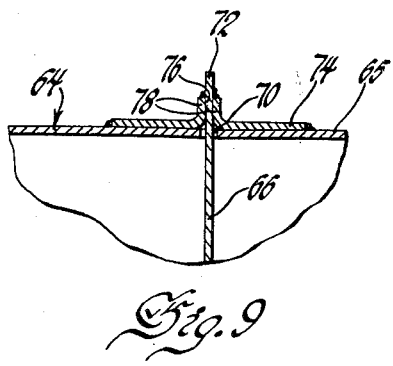
Figure 10:
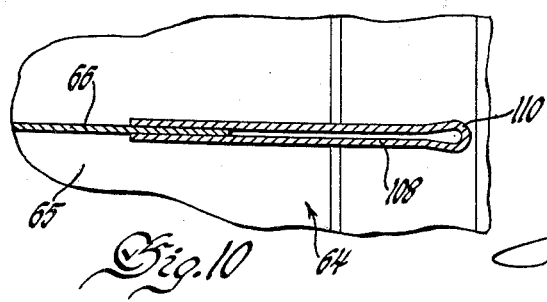

Other features, advantages and objects will become apparent by reference to the detailed description of the invention and to the drawings wherein:

FIGURE 1 is a diagrammatic view of a gas turbine engine with an air bleed embodying this invention, FIGURE 2 diagrammatically illustrates a partial cross-sectional view taken on the plane indicated by the line 2—2 of FIGURE 1, FIGURE 3 is an enlarged cross-sectional view of a portion of the gas turbine engine taken on the plane indicated by the line 3—3 of FIGURE 2, FIGURE 4 is an enlarged cross-sectional view taken on the plane indicated by the line 4—4 of FIGURE 3, FIGURE 5 is a cross-sectional view taken on the plane indicated by the line 5—5 of FIGURE 3, FIGURE 6 is an enlarged cross-sectional view of a portion of the bleed taken on a plane indicated by the line 6—6 of FIGURE 3, FIGURE 7 is an enlarged perspective view of the forward portion of the air bleed looking rearwardly from the top down, FIGURE 8 is an enlarged perspective view of the underside of a portion of the air bleed looking forwardly, FIGURE 9 is an enlarged cross-sectional view of a detail taken on the plane indicated by the line 9—9 of FIGURE 3, FIGURE 9a is an exploded perspective view of the detail of FIGURE 9, and FIGURE 10 is an enlarged cross-sectional view of a detail taken on the plane indicated by the line 10—10 of FIGURE 3.

Referring now to the drawings and more particularly to FIGURE 1, there is shown diagrammatically therein a dual-spool gas turbine engine 10 having a first or low pressure compressor section 12, a second or high pressure compressor section 14, a combustion section 16, a first turbine section 18, a second turbine section 20 and an exhaust duct 22. Connected to the engine at the transition section 24 between the first and second compressor sections 12 and 14 are a number of air bleed or by-pass ducts 26, each having a forward transition section 28, an elliptical or oval connecting portion 30, and a rearward transition section 32. The flow of air or gas through the bleeds 26 is controlled by a valve indicated schematically at 34, which may be of the simple check valve type, butterfly type valve or the like. The details of the valve per se form no part of the present invention and therefore will not be described. Suffice it to say that the valve is operated to permit the by-passing of air through the duct at a predetermined flight speed, while preventing air bleeding below the flight speeds at which it is desirable and at those conditions where the pressure at the exhaust duct exceeds the low pressure compressor discharge pressure.

FIGURE 2 shows a partial section of the engine looking forwardly to illustrate the disposition of the forward transition sections of the air bleed with respect to the engine. The concentric turbine shafts 33 and 35 along with the diagrammatic showing of the blades 37 of the high pressure compressor 14 and the engine casing 41 are illustrated merely for showing the circumferential and radial location of the air bleeds 26. The bleeds comprise three in number abutting each other circumferentially at their arcuate inlet ends 36 to extend approximately 120 degrees around the engine. From their inlet ends, as best seen in FIGURES 7 and 8, the sections 28 are each tapered rearwardly both in an axial and circumferential direction, curved to conform to the shape of the engine, and connected to the elliptical or oval connecting duct 30 by a discharge opening 38, each discharge opening being circumferentially spaced from the others by an equal amount. Since the forward and rearward transition sections 28 and 32, respectively, of all the air bleeds 26 are constructed in a similar manner and are of approximately the same shape, it is believed necessary to describe only the construction of one forward transition section 28.

Reference is made to FIGURES 3 to 10 for a more complete showing of the structure of the forward transition section, wherein, in FIGURE 3, portions of the low pressure compressor section 12, transition section 24, high pressure compressor section 14, and the transition section 28 are shown. The low pressure compressor 12, shown with one of its stator blade rows 39, has a casing 40 fixed to the forward flanged end 42 of the transition casing section 24 by an annular flange 44 abutting thereagainst and secured together by suitable bolt and nut means 46. The high pressure compressor 14, shown with some of its rotor blade rows 48 and stator blade rows 50, has a casing 51 abutting at its forward flanged end 52 the flanged rearward portion 54 of the transition section casing 24, both secured together by suitable bolts 56. The transition section is provided at its radially outermost portion with a diagonally rearwardly extending annular air or gas duct 58 flanged at its end 60 for connection with the flanged inlet portion 36 of the forward transition section 28. The outermost radial portion of flanges 60 and 36 are connected by an annular V-band clamp, with the innermost portions being connected to each other and to the compressor 14 by a wire braid seal 43 and the bolts 56. The seal 43 prevents the bleeding of air from the high pressure compressor section at this point.

Each transition section air bleed 28 is shown having its arcuate inlet 36 (FIG. 7) connected to the elliptical discharge end 62 (FIGS. 4 and 8) by a thin-walled duct or conduit means 64 tapering rearwardly both circumferentially and axially as shown. The skin or wall 65 of the duct is constructed of metal sufficiently thin, .020–.030 inch thick, for example, to permit the skin to "balloon" out to a natural or free shape approximating a catenary curve form upon the admission of air or gas under pressure thereto from the transition section. By the use of such a construction, the air bleed will be as light as possible so as not to detract from the performance of the engine.

To prevent undue distortion or rupturing of the skin or wall 65 of the duct 64, a number of radially standing reinforcing ribs or vanes 66 are provided attached to both the top and bottom portions of the skin in a manner to be described, having a taper increasing longitudinally from the inlet 36 towards the discharge end 62. The ribs 66 are provided with lightening holes 68 and are secured to the thin-skinned wall 65 in a manner shown in FIGURES 5, 6, 7, 8 and 9.

The wall 65 is provided on both its top and bottom surfaces with a number of slots 70 equally spaced axially from each other for receiving stiffener projections 72 formed on both the top and bottom of rib members 66. To strengthen the connection between the wall 65 of the duct and the rib projections 72 at these points, and to prevent tearing of the skin of the duct, a number of flat thin metal plates or strips 74 of, for example, 0.030 inch thickness, extending the length of each of the ribs 66, are welded to the skin of the duct. Each of the plates 74 is provided with a number of equally spaced slots 76 obtained by extruding the metal at these locations into a deep bead, and then shearing off the bead. The plate is then placed over the skin with the rib projections 72 extending through both the slots 70 and 76, and the plates are welded as by brazing to both the wall of the duct and the rib projections. By extruding the plates 74 in this manner, guide and reinforcing flanges 78 are provided surrounding the rib projections, thereby maintaining the ribs 66 vertically in the duct 64 and assuring a stronger connection at these points without tearing of the skin. After extruding, the edges of the plates are trimmed longitudinally to present straight edges 80 extending the length of the ribs they overlie.

The ribs 66 divide the duct 64 into a number of fluid ducts 82 for the passage of air therethrough. The ribs are approximately equally spaced circumferentially at the arcuate inlet end 36 as shown in FIGURE 7 to provide openings of equal flow area. The two passages 84 and 86 are blind leads, with the ribs 66 merging at 88 and 90, the close spacing being for better reinforcing at these points. Because of the tapering shape of the duct 64 changing from an arcuate inlet end to an elliptical discharge end at 62, and since it is necessary to maintain the volume of flow through the duct constant, many of the ribs 66, as shown in FIGURES 7 and 8, are terminated short of the discharge end 62 as at 92, 94, 96, 98, 100, 102, 104 and 106.

As shown in FIGURE 10, the ends of the ribs 66 adjacent the discharge end 62 of the air bleed are shown welded to an end member 108 having a rounded end portion 110 projecting towards the connecting portion 30 for smoother flow characteristics. Section 28 is connected to the ellipitical connecting portion 30 by a V-band type clamp 112 as indicated in FIGURE 3.

Referring now to FIGURES 5 and 6, the initial shapes of the flexible wall portions 65 of the duct 64 between the ribs 66 at various sections along the length of the bleed are shown. In FIGURE 5, which is one-half of a section near the inlet 36 of the bleed or by-pass, the wall portions 65 are shown having a slightly curved form because of the distance between ribs, whereas, in FIGURE 6, illustrating an enlarged portion of a section to the rear of that shown in FIGURE 5, with the ribs 66 closer together, the wall portions are more greatly curved, the curve in each case closely approaching a catenary curve form. The purpose of pre-curving the wall portions is to reduce the stress on the skin by having the skin more nearly approach the final shape the wall portions will assume when air under pressure is passed through the bleed. These shapes may be calculated, or may be obtained by providing an initial curvature, pre-testing the bleed under pressure, and then correcting the curvature to correspond to the shape obtained. It will be clear that the wall portions 65 can be initially straight instead of curved as shown, with the same effect occuring under pressure, i.e., the wall portions will assume the same ballooned-out shape. The wall portions are constructed of thin metal to make the structure as light as possible, and because of the thinness will, under pressure, "balloon" out beyond the shape that is shown in FIGURES 5 and 6 to a free or naturally curved form. When pressure is admitted through the air passages 82, and the flexible wall portions assume a free shape, the skin 65 takes the load in hoop tension because of the curved shape and the load is transferred to the ribs 66, thereby placing the ribs in tension. Thus the greatest amount of the load is carried by the ribs and the flexible wall portions are not ruptured.

FIGURES 7 and 8, and particularly FIGURE 7, illustrate the ballooned out shape of the wall portions between ribs after pressure is once admitted to the air bleed. It will also be seen in these figures that the rounded edge portions 114 are reinforced at their forward inlet ends by suitably shaped reinforcing means 116.

In the operation of this air-bleed, at predetermined flight speeds and other conditions as described where surge may occur in the low pressure compressor 12, the valve 34 will be opened to permit air or gas, discharged from the low pressure compressor, to flow through the duct 58 of the transition section and through the air bleed or by-pass 26. The flexible top and bottom wall portions 65 of the forward transition section of the air-bleed will immediately be forced outwardly under pressure to assume a natural or free-shape approximating a catenary curve form, the wall portions 65 taking the load in hoop tension and transferring the load to the ribs 66. The ribs are thereby placed in tension relieving the load on the skin or wall portions. The air or gas then continues through the elliptical connecting section 30, through the rearward transition section 32 shaped similarly to the forward transition section 28, and is discharged back into the engine at the exhaust duct. The discharge into the exhaust duct may be at the inlet to the afterburner unit, if one is provided.

Thus, an extremely light air bleed or by-pass is provided for relieving the back pressure of air at the low pressure compressor, thereby taking the compressor out of surge and providing satisfactory performance at these flight speeds. The light weight of the air-bleed, made possible by a novel construction, permits by-passing of a portion of the gas or air without sacrificing engine performance. The shape and spacing of the air bleeds also provide space for access to the combustion section, and for the mounting of accessories on the engine.

Thus it will be seen that this invention provides an efficient and novel air bleed to prevent surge and stage mismatching in a dual-spool gas turbine engine.

While the by-pass arrangement shown is for a dual-spool engine, it will be clear that it could also be used in connection with interstage bleeding of air from an engine having a single compressor.

It will be understood that the invention can be modified beyond the illustrated embodiments, and therefore, any limitations to be imposed are those set forth in the following claims.

I claim:

1. Gas conduit means for the passage of gas under pressure therethrough, said conduit means having a gas inlet and outlet, and tapered flexible means connecting said inlet to said outlet, said conduit means including a plurality of spaced longitudinally extending means dividing said conduit means into a plurality of gas passages, said tapered flexible means having a plurality of longitudinally spaced slots overlying said longitudinally extending means, said latter means having a plurality of projections each extending into a slot in said tapered flexible means, and longitudinally extending reinforcing means fixed to said projections and said flexible means for connecting said projections and said flexible means, said reinforcing means having a plurality of extruded holes each receiving one of said projections, the extrusion of said holes providing flanged portions, one of said portions being secured to said flexible means and another of said portions being secured to said projections, said flexible means connecting said spaced longitudinally extending means, the passage of gas under pressure through said passages moving said flexible means to assume a curved free shape approximating a catenary curve form, said curved shape causing a transfer of the force of said gas from said flexible means to said longitudinally extending means.

2. A lightweight duct adapted to conduct fluids under significant pressure, the duct having a generally flattened cross-section with a major and a minor dimension transverse to the lengthwise direction of the duct, the duct comprising, in combination, a tube of lightweight flexible metal constituting the wall of the duct, and a plurality of ribs extending lengthwise of the duct and across the duct transverse to the major dimension of the duct, each rib being secured at the opposite lateral edges thereof to portions of the said wall so as to be put in tension by the fluid pressure within the duct acting upon the portions of the wall, the wall between the portions secured to said rib edges being ballooned outwardly between the ribs by the fluid pressure so as to minimize stress in the duct wall.

3. A lightweight duct adapted to conduct fluids under significant pressure, the duct having a generally flattened cross section with a major and a minor dimension transverse to the lengthwise direction of the duct, the duct having a substantially crescent shaped inlet at one end and a substantially oval shaped outlet at the other end, the duct comprising, in combination, a converging tube of lightweight flexible metal constituting the wall of the duct, said tube having a constant area in cross section, the shapes of said inlet and outlet and cross section area of said tube providing flow and directional control of the fluid passing through the tube, the thickness of the wall being such as to permit flexing of said wall under the pressure of fluid acting thereagainst, and a plurality of ribs extending lengthwise of the duct and across the duct transverse to the major dimension of the duct, each rib being secured at the opposite lateral edges thereof to portions of the said wall so as to be put in tension by the fluid pressure within the duct acting upon the wall, the portions of the wall between the portions secured to said rib edges being ballooned outwardly by the fluid pressure so as to minimize stress in the duct wall.

4. A lightweight fluid pressure conduit means comprising a thin longitudinally extending fluid duct having a flexible wall converging laterally and diverging radially along its longitudinal length forming a fluid inlet and outlet at opposite ends of different relative shapes for flow and directional control of said fluid, relatively rigid rib means secured at its opposite lateral edges to portions of the wall of said duct and extending longitudinally from said inlet towards said outlet to form together with the duct wall juxtaposed fluid passages, the duct wall thickness being such that the wall portions between the portions secured to said rib means are forced radially outwardly seeking their own shapes under the pressure of fluid passing through said duct thereby placing the rib means in tension and minimizing the stresses on said duct wall.

5. A lightweight fluid pressure conduit means comprising a thin longitudinally extending fluid duct of constant area in cross section having a flexible wall converging laterally and diverging radially along its longitudinal length forming a fluid inlet and outlet of different shapes for flow and directional control of said fluid, a plurality of relatively rigid rib means of varying lengths each secured at its opposite lateral edges to portions of the wall of said ducting and extending longitudinally from said inlet towards said outlet, said rib means each being spaced laterally from each other with respect to the longitudinal axis of said duct to divide said duct into separated juxtaposed fluid passages, the varying longitudinally extent of said rib means and the convergence of said duct effecting a merger of some of said passages to maintain the volume of flow through the passages constant, said ducting being of a thickness such that the duct wall portions between the portions secured to said rib means are forced radially outwardly seeking their own shapes under the pressure of fluid passing through said duct placing the rib means in tension and minimizing the stresses on said duct wall.

6. A fluid pressure conduit means as in claim 5 wherein the duct wall in cross section is composed of a series of juxtaposed catenary curves during passage of the fluid through said passages.

7. Lightweight fluid pressure ducting adapted to conduct fluid under pressure comprising a plurality of circumferentially arranged longitudinally extending ducts having contiguous fluid inlets each formed as the sector of an annulus in cross section and together forming a complete fluid annulus at the inlet ends communicating with a source of fluid under pressure, the ducts each having a fluid outlet at the opposite end circumferentially separated from the others and of a shape different from said inlet, said ducts each converging laterally and diverging radially along its longitudinal length from said inlet to said outlet for maintaining a constant area in cross section of said duct, said ducting controlling the flow and direction of distribution of the entire volume of any fluid passing through said inlet.

References Cited in the file of this patent

UNITED STATES PATENTS

| | | | |
|---|---|---|---|
| 228,947 | Seaman | June | 15, 1880 |
| 1,453,220 | Witzenmann | Apr. | 24, 1923 |
| 1,485,512 | Cocq et al. | Mar. | 4, 1924 |
| 1,668,179 | Williams | May | 1, 1928 |
| 1,930,285 | Robinson | Oct. | 10, 1933 |
| 2,000,906 | Turner | May | 14, 1935 |
| 2,171,023 | Buxton | Aug. | 29, 1939 |
| 2,257,524 | Bogory | Sept. | 30, 1941 |
| 2,556,161 | Bailey | June | 12, 1951 |
| 2,602,614 | Cole | July | 8, 1952 |
| 2,653,782 | Pfaff, Jr. | Sept. | 29, 1953 |
| 2,703,477 | Anxionnaz | Mar. | 8, 1955 |
| 2,720,221 | Neilson | Oct. | 11, 1955 |
| 2,810,258 | Cook | Oct. | 22, 1957 |
| 2,968,918 | Denison | Jan. | 24, 1961 |
| 2,976,679 | Dalgleish | Mar. | 28, 1961 |

FOREIGN PATENTS

| | | | |
|---|---|---|---|
| 22,758 | Great Britain | Oct. | 14, 1896 |
| 773,584 | France | Sept. | 3, 1934 |
| 330,182 | Itlay | Oct. | 7, 1935 |

UNITED STATES PATENT OFFICE
CERTIFICATE OF CORRECTION

Patent No. 3,070,131            December 25, 1962

John B. Wheatley

It is hereby certified that error appears in the above numbered patent requiring correction and that the said Letters Patent should read as corrected below.

Column 5, line 75, strike out "the portions of"; column 6, line 1, after "wall", first occurrence, insert -- the portions of --; column 8, line 3, for "Bailey" read -- Bailey et al --; line 15, for "Itlay" read -- Italy --.

Signed and sealed this 16th day of July 1963.

(SEAL)
Attest:

ERNEST W. SWIDER
Attesting Officer

DAVID L. LADD
Commissioner of Patents